United States Patent
Asada et al.

(10) Patent No.: US 9,268,183 B2
(45) Date of Patent: Feb. 23, 2016

(54) LIQUID CRYSTAL DISPLAY DEVICE

(75) Inventors: Katsushige Asada, Osaka (JP);
Masahiro Yoshida, Osaka (JP);
Masakatsu Tominaga, Osaka (JP);
Tetsuya Fujikawa, Osaka (JP); Junichi Morinaga, Osaka (JP); Toshiaki Fujihara, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 171 days.

(21) Appl. No.: 12/865,030

(22) PCT Filed: Dec. 3, 2008

(86) PCT No.: PCT/JP2008/071971
§ 371 (c)(1),
(2), (4) Date: Jul. 28, 2010

(87) PCT Pub. No.: WO2009/130819
PCT Pub. Date: Oct. 29, 2009

(65) Prior Publication Data
US 2010/0328558 A1    Dec. 30, 2010

(30) Foreign Application Priority Data

Apr. 22, 2008 (JP) .................. 2008-111513

(51) Int. Cl.
*G02F 1/1362* (2006.01)
*G02F 1/1337* (2006.01)
(Continued)

(52) U.S. Cl.
CPC .... *G02F 1/136213* (2013.01); *G02F 1/133707* (2013.01); *G02F 1/136286* (2013.01); *G02F 1/133553* (2013.01);
(Continued)

(58) Field of Classification Search
CPC ............... G02F 1/136213; G02F 1/136286; G02F 1/133707; G02F 1/1365; G02F 1/1368; G02F 1/1309
USPC ....................... 349/41, 47, 129, 191
See application file for complete search history.

(56) References Cited

U.S. PATENT DOCUMENTS 5,757,444 A * 5/1998 Takemura .................. 349/38
6,011,600 A * 1/2000 Kamada et al. ............ 349/44
(Continued)

FOREIGN PATENT DOCUMENTS

CN    1105328 C    4/2003
CN    101089692 A    12/2007
(Continued)

OTHER PUBLICATIONS

Russian Decision on Grant issued in Russian Patent Application No. 2010136306 on Feb. 24, 2012.
(Continued)

*Primary Examiner* — Antohony G Quash
(74) *Attorney, Agent, or Firm* — Birch, Stewart, Kolasch & Birch, LLP

(57) ABSTRACT

At least either a first substrate or a second substrate has regions corresponding to subpixels (15a, 15b, 15c) and provided with ribs (100a) for controlling how a liquid crystal material is aligned. Scanning signal lines (32) and picture element electrodes (60) are overlapped with each other via an insulating material as seen in plan view. The ribs (100a) and the scanning signal lines (32) are at least partially overlapped with each other as seen in plan view.

18 Claims, 11 Drawing Sheets

(51) Int. Cl.
  *G02F 1/1335* (2006.01)
  *G02F 1/1343* (2006.01)
  *G02F 1/136* (2006.01)

(52) U.S. Cl.
  CPC ............ *G02F 2001/13606* (2013.01); *G02F 2001/13629* (2013.01); *G02F 2001/134345* (2013.01); *G02F 2201/40* (2013.01)

(56) References Cited

U.S. PATENT DOCUMENTS

| | | | |
|---|---|---|---|
| 6,249,326 B1* | 6/2001 | Hebiguchi | 349/42 |
| 6,573,964 B1 | 6/2003 | Takizawa et al. | |
| 6,577,366 B1 | 6/2003 | Kim et al. | |
| 6,809,787 B1 | 10/2004 | Seo et al. | |
| 6,839,108 B1* | 1/2005 | Hirakata et al. | 349/114 |
| 7,119,870 B1 | 10/2006 | Nishikawa et al. | |
| 7,450,202 B2* | 11/2008 | Tsuchiya | 349/114 |
| 7,535,526 B1* | 5/2009 | Kim | 349/113 |
| 7,675,582 B2* | 3/2010 | Luo et al. | 349/39 |
| 7,746,415 B2* | 6/2010 | Tsuchiya et al. | 349/33 |
| 2002/0076845 A1 | 6/2002 | Noritake et al. | |
| 2003/0179172 A1* | 9/2003 | Miyachi | 345/89 |
| 2003/0202145 A1 | 10/2003 | Takizawa et al. | |
| 2004/0008295 A1* | 1/2004 | Ueda et al. | 349/44 |
| 2004/0125251 A1* | 7/2004 | Kim | 349/43 |
| 2005/0248700 A1* | 11/2005 | Takagi et al. | 349/110 |
| 2006/0044496 A1 | 3/2006 | Tsuchiya | |
| 2006/0050210 A1* | 3/2006 | Tsuchiya | 349/114 |
| 2006/0203173 A1 | 9/2006 | Kim et al. | |
| 2006/0227274 A1* | 10/2006 | Do et al. | 349/139 |
| 2007/0058096 A1 | 3/2007 | Tsai et al. | |
| 2007/0097280 A1 | 5/2007 | Choi et al. | |
| 2007/0126973 A1* | 6/2007 | Ikeda et al. | 349/155 |
| 2007/0262315 A1 | 11/2007 | Lee et al. | |
| 2007/0285605 A1* | 12/2007 | Kim et al. | 349/128 |
| 2007/0285607 A1 | 12/2007 | Kim et al. | |
| 2007/0296898 A1* | 12/2007 | Cho et al. | 349/139 |
| 2008/0036932 A1* | 2/2008 | Lee | 349/38 |
| 2008/0049155 A1* | 2/2008 | Yagi et al. | 349/39 |
| 2008/0218674 A1* | 9/2008 | Fan Jiang et al. | 349/123 |
| 2009/0073335 A1 | 3/2009 | Yagi et al. | |

FOREIGN PATENT DOCUMENTS

| | | | | |
|---|---|---|---|---|
| EP | 1 795 948 A1 | | 6/2007 | |
| JP | 63-81327 A | | 4/1988 | |
| JP | 11-167127 A | | 6/1999 | |
| JP | 2000-193978 | * | 7/2000 | ............ G02F 1/1337 |
| JP | 2000-193978 A | | 7/2000 | |
| JP | 2004-93826 A | | 3/2004 | |
| JP | 2006-58737 A | | 3/2006 | |
| JP | 2006-71866 A | | 3/2006 | |
| JP | 2007-025729 A | | 2/2007 | |
| JP | 2007-128094 | * | 5/2007 | ............ G02F 1/1368 |
| JP | 2007-128094 A | | 5/2007 | |
| JP | 2007-156328 A | | 6/2007 | |
| JP | 2007-233015 A | | 9/2007 | |
| JP | 2008-026908 | * | 2/2008 | ............ G02F 1/1368 |
| SU | 1531867 A3 | | 12/1989 | |
| TW | 546528 B | | 8/2003 | |
| WO | WO 2006/054386 A1 | | 5/2006 | |

OTHER PUBLICATIONS

European Search Report issued in European Patent Application No. 08874023.8 on Feb. 17, 2012.

* cited by examiner

F I G. 1
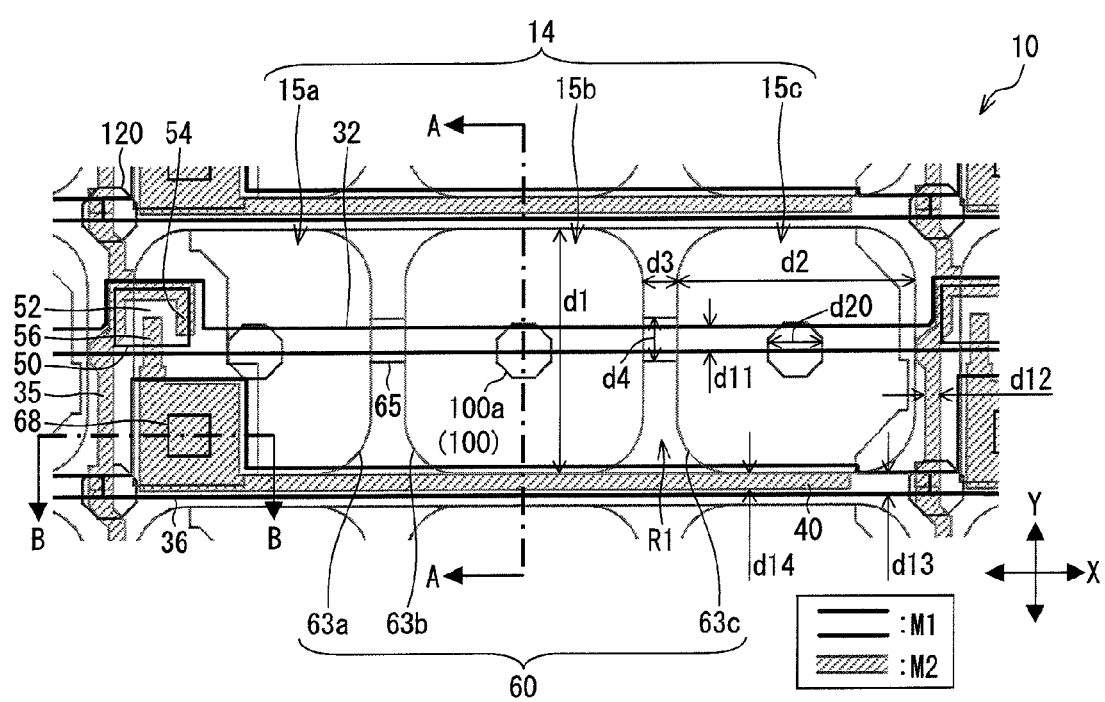

F I G. 1 7
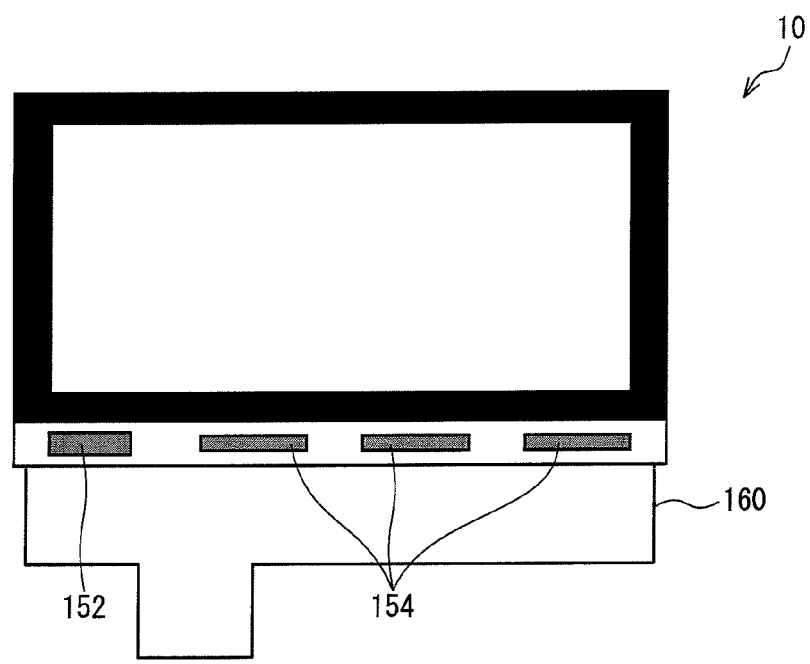

LIQUID CRYSTAL DISPLAY DEVICE

BACKGROUND OF THE INVENTION

1. Field of the Invention

The present invention relates to liquid crystal display devices and, in particular, to a liquid crystal display device having so-called horizontally long picture element electrodes.

2. Description of the Related Art

Conventionally, liquid crystal display devices and, in particular, active-matrix liquid crystal display devices have been widely used as display devices.

Such an active-matrix liquid crystal display device has picture elements respectively provided with switching elements, and the switching elements are controlled by providing a plurality of scanning signal lines and a plurality of video signal lines intersecting with each other. The switching elements are provided at points of intersection between the scanning signal lines and the video signal lines, and picture element electrodes connected to the switching elements are provided in such a way as to correspond to the picture elements, respectively.

(Alignment Modes)

There have been proposed various modes of alignment of liquid crystal molecules in such a liquid crystal display device. The following describes the modes of alignment of liquid crystal molecules.

Examples of the various alignment modes proposed so far include: the TN (twisted nematic) mode, in which liquid crystal molecules are twisted approximately 90 degrees; the VA (vertical alignment) mode, in which liquid crystal molecules are aligned nearly vertically to a substrate; and the like.

In particular, such a liquid crystal display device of the VA mode or the like may be provided with alignment controlling parts for controlling which direction the liquid crystal molecules are aligned along. The following gives an explanation with reference to FIG. 12. FIG. 12 is a cross-sectional view schematically showing the configuration of a liquid crystal display device.

For example, in such a liquid crystal display device of the VA mode, each picture element may be provided with a plurality of alignment regions, i.e. multiple domains, for improving viewing angle dependency. Moreover, the multiple domains may be formed by providing projections or notches cut in the pixels. The following gives a specific explanation.

That is, as shown in FIG. 12, a liquid crystal display device 10 includes a first substrate 22, a second substrate 24 opposed to the first substrate 22, and a liquid crystal material 28 sandwiched between the first substrate 22 and the second substrate 24. Provided on the first substrate 22 is an insulating film 70. Provided on the insulating film 70 are picture element electrodes 60. Provided on the picture element electrodes 60 is an alignment film 112.

On the other hand, the second substrate 24 is provided with a common electrode 90 serving as a counter electrode, as well as a color filter (not shown) and a black matrix (not shown). Further provided on the common electrode 90 is an alignment film 114.

In the liquid crystal display device 10 of FIG. 12, the second substrate 24 is provided with ribs (rivets) 100a serving as such alignment control parts 100 as mentioned above.

Each of the ribs 100a, which are projections provided on the second substrate 24, has a truncated conical shape. FIG. 12 shows a region corresponding substantially to a single picture element 14, and each picture element 14 is provided with such an alignment control part 100 as mentioned above.

As for a liquid crystal display device provided with such alignment control parts 100 as mentioned above, a technique for providing a rib in a center section of each subpixel (sub-picture element) is disclosed, for example, in Patent Literature 1.

CITATION LIST

Patent Literature 1

Japanese Patent Application Publication, Tokukai, No. 2007-156328 A (Publication Date: Jun. 21, 2007)

Patent Literature 2

Japanese Patent Application Publication, Tokukaihei, No. 11-167127 A (Publication Date: Jun. 22, 1999)

SUMMARY OF INVENTION

However, such a conventional configuration as disclosed in Patent Literature 1 is prone to be low in optical transmittance.

That is, the ribs 100a, which serves as such alignment control parts 100 as mentioned above, are generally low in their optical transmittance because they are made of material of various kinds such as resin.

For this reason, that portion of each picture element 14 which is provided with its corresponding rib 100a is lower in optical transmittance than that portion of the picture element 14 which is not provided with such a rib 100a. Furthermore, the portion in which the rib has been formed serves as a boundary between different directions of alignment of the liquid crystal material, with the result that liquid crystal molecules are prone to be aligned along an undesirable direction. For this reason, the portion in which the rib has been formed is so insufficient in optical transmittance that a desired display may not be obtained.

Therefore, the liquid crystal display device thus configured is prone to be low in optical transmittance and display quality as a whole.

(Notches)

Alternatively, such a configuration is also possible in which the alignment control parts 100 are provided as notches cut in the electrode(s), not as projections such as the ribs 100a. An explanation is given with reference to (a) and (b) of FIG. 13, which are cross-sectional views each schematically showing the configuration of a liquid crystal display device 10.

(a) of FIG. 13 shows the configuration of a liquid crystal display device 10 in which instead of the ribs 100a, notches 100b are provided in the common electrode 90 of the second substrate 24 as such alignment control parts 100 as shown in FIG. 12.

The "notches 100b" here mean missing portions each formed by cutting out a portion of an electrode, such as the common electrode 90, within the region of its corresponding picture element 14.

Further, the notches can each be provided for example, on the first substrate 22 within its corresponding picture element 14, instead of being provided on the second substrate 24 within its corresponding picture element 14. Specifically, as shown in (b) of FIG. 13, the notches 100c can be provided in the picture element electrodes 60 opposed to the common electrode 90.

It should be noted here that regardless of whether the notches are provided on the first substrate 22, the second substrate 24, or both of them, the notches cause the liquid crystal display device 10 to become lower in optical transmittance as a whole.

The reason for this is that because it hard to apply a voltage to the liquid crystal material 28 in such notched portions, it is hard to obtain a desired optical transmittance when the liquid crystal display device 10 is turned on.

As described above, a liquid crystal display device provided with alignment control parts is prone to be low in optical transmittance.

(Vertically Long Picture Element Electrodes)

The following describes the shape of each picture element in a liquid crystal display device.

In general, the shape of a picture element is a vertically long shape; accordingly, the shape of a picture element electrode provided to the picture element is also a vertically long shape. The following gives an explanation with reference to (a) of FIG. 14. (a) of FIG. 14 shows an arrangement of picture elements 14 in a liquid crystal display device 10 capable of a color display.

For a color display, three kinds of picture elements 14, namely R (red), G (green), and B (blue) picture elements 14, are provided as shown in (a) of FIG. 14.

Moreover, a set of such three picture elements 14, namely R, G, and B picture elements 14, forms a single pixel 16.

The pixel 16 generally takes the shape of a square, for example, so that a more natural-looking image can be shown to a person who watches the liquid crystal display device 10. Moreover, in most cases, the liquid crystal display device 10 takes the shape of a horizontally long rectangle; therefore, each of the picture elements 14 has a vertically long shape so that a larger number of signal lines can be drawn from a longer side of the rectangle.

Specifically, the pixel 16 is divided longitudinally into three picture elements 14, namely R, G, and B picture elements 14, each having a vertically long shape, whereby each pixel 16 has three vertical signal lines (video signal lines 35) and one horizontal signal line (scanning signal line 32), with the result that a larger number of signal lines are drawn from a horizontally long side of the rectangle than from a vertical side of the rectangle.

Further, each of the picture elements 14 has a picture element electrode 60 formed across substantially the whole region thereof; therefore, as the picture element 14 has a vertically long shape as mentioned above, the picture element electrode 60 also has a vertically long shape.

(Horizontally Long Picture Element Electrodes)

As opposed to such vertically long picture element electrodes 60, there have been proposed a configuration having horizontally long picture element electrodes 60. This configuration is intended to lower power consumption by reducing the number of video signal lines 35. The following gives an explanation with reference to (b) of FIG. 14. (b) of FIG. 14 shows an arrangement of picture elements 14 in a liquid crystal display device 10 capable of a color display, as in (a) of FIG. 14.

In such liquid crystal display device 10 having horizontally long picture element electrodes 60, as shown in (b) of FIG. 14, each pixel 16 is divided transversely into three horizontally long picture elements 14 formed within the pixel 16, instead of being divided longitudinally as mentioned above. The picture elements 14 are R, G, and B picture elements 14, respectively.

As each of the picture elements 14 has a horizontally long shape, its corresponding picture element electrode 60 also has a horizontally long shape.

Adoption of such a configuration makes it possible to reduce the number of video signal lines 35, i.e. vertical signal lines, to 1 for each pixel 16, albeit increasing the number of scanning signal lines 32, i.e. horizontal signal lines, to 3. Because the number of drivers for video signal lines 35, which drivers are generally higher in power consumption and manufacturing cost than drivers for scanning signal lines 32, can be reduced, lower power consumption and manufacturing cost reduction can be achieved.

Furthermore, because the drivers for scanning signal lines 32 are less complex than the drivers for video signal lines 35, a further reduction in manufacturing cost can be achieved by forming the circuitry on the same substrate in forming the scanning signal lines 32 and the video signal lines 35 on the substrate.

Further, because the drivers for scanning signal lines 32 are less complex in driver circuitry than the drivers for video signal lines 35, a reduction in amount of space where the drivers are mounted can be achieved. This reduction contributes to a reduction in size of the liquid crystal display device 10.

Further, because the drivers for scanning signal lines 32 are less complex in driver circuitry than the drivers for video signal lines 35, it is easy to form a driver circuit for the scanning signal lines 32 and a driver circuit for the video signal lines 35 into a single driver. In this case, the number of drivers can be reduced, which contributes to not only a reduction in size of the liquid crystal display device 10 but also a reduction in cost of mounting drivers.

Such a liquid crystal display device having horizontally long picture element electrodes is disclosed, for example, in Patent Literature 2. That is, for the purpose of manufacturing cost reduction and lower power consumption, Patent Literature 2 discloses a liquid crystal display device having picture element electrodes whose longer sides extend along scanning signal lines.

The term "liquid crystal capacitor" here means a capacitor that is formed via a liquid crystal material between such a picture element electrode and such a common electrode and has such characteristics that its dielectric constant, i.e. capacitance, varies according to the applied voltage and the temperature. The term "storage capacitor" here means a capacitor, provided in parallel with such a liquid crystal capacitor, which functions to improve display quality by preventing a change in picture element potential from being caused by a change in liquid crystal capacitance.

The following gives an explanation with reference to FIGS. 15 and 16, which each schematically show the configuration of a liquid crystal display device having horizontally long picture element electrodes. It should be noted here that both the liquid crystal display device of FIG. 15 and the liquid crystal display device of FIG. 16 have their signal scanning lines 32 each formed between adjacent picture element electrodes 60.

However, the liquid crystal display device of FIG. 15 and the liquid crystal display device of FIG. 16 employ different storage capacitor forming methods. That is, the liquid crystal display device 10 of FIG. 15 has storage capacitor lines 36 each formed in the central part of its corresponding picture element electrodes 60, and each storage capacitor line 36 forms a storage capacitor in combination with a storage capacitor counter electrode 40 formed in a position overlapped with the storage capacitor line 36.

On the other hand, the liquid crystal display device 10 of FIG. 16 has no storage capacitor lines 36, and each scanning signal line 32 formed between adjacent picture element electrodes 60 forms a storage capacitor in combination with a storage capacitor counter electrode 40 formed in a position overlapped with the scanning signal line 32 (CS on-gate method).

In any one of such liquid crystal display devices 10 having horizontally long picture element electrodes 60 as shown in FIGS. 15 and 16, provision of a scanning signal line 32 between adjacent picture element electrodes 60 increases the distance over which the scanning signal line 32 is in close proximity to the picture element electrodes 60. As a result, the liquid crystal display device 10 prone to generation of display unevenness (alignment abnormality) due to generation of an oblique electric field in a region (see a region R40 shown in FIG. 15) where the picture element electrodes 60 face the scanning signal line 32.

Further, the configuration shown in FIG. 16, which requires a comparatively large scanning signal line area for obtaining a necessary storage capacitance, has difficulty achieving both high display quality and a high aperture ratio.

Thus, such horizontally long picture element electrodes have a problem with provision of a scanning signal line between adjacent picture element electrodes.

Accordingly, such a configuration is possible in which instead of being provided between the picture element electrodes, the scanning signal line is provided within a picture element electrodes or, in other words, provided in such a way as to be overlapped with a picture element electrode as seen in plan view.

However, a liquid crystal display device so configured is prone to become lower in optical transmittance as a whole due to a decrease in aperture ratio.

That is, in general, scanning signal lines are made of metal and therefore will not transmit light. For this reason, that portion of a picture element in which such a scanning signal line has been formed does not contribute to a display, thus inviting a decrease in aperture ratio.

The present invention has been made in view of the foregoing problems, and it is an object of the present invention to allow a liquid crystal display device provided with alignment control parts to achieve a bright display with a high aperture ratio by suppressing a decrease in aperture ratio.

It is another object of the present invention to achieve a liquid crystal display device low in manufacturing cost by reducing the number of liquid crystal drivers and the cost of mounting them.

In order to solve the foregoing problems, a liquid crystal display device according to the present invention includes a first substrate, a second substrate, and a liquid crystal material sandwiched between the first substrate and the second substrate, with picture elements arranged in a matrix, the first substrate being provided with: a plurality of scanning signal lines; a plurality of video signal lines intersecting with the scanning signal lines; a plurality of switching elements electrically connected to the scanning signal lines and the video signal lines; and picture element electrodes electrically connected respectively to the switching elements and provided in such a way as to correspond respectively to the picture elements, the second substrate being provided with a common electrode, at least either the first substrate or the second substrate having regions corresponding to the picture elements and provided with alignment control parts for controlling how the liquid crystal material is aligned, at least either the scanning signal lines or the video signal lines being overlapped with the picture element electrodes via an insulating material as seen in plan view, the alignment control parts and the signal lines overlapped with the picture element electrodes being at least partially overlapped with each other as seen in plan view.

According to the foregoing configuration, the alignment control parts and the signal lines are overlapped with each other within the picture elements.

It should be noted here that the alignment control parts serve to cause liquid crystal molecules contained in the liquid crystal material to be aligned along a desired direction. Specifically, examples of the alignment control parts include projections formed in such a way as to face the liquid crystal material, notches cut in the electrode(s) facing the liquid crystal material, and the like.

Moreover, as described above, the regions where the alignment control parts have been formed as seen in plan view are prone to be lower in optical transmittance than the regions where no such alignment control parts have been formed.

On the other hand, in general, signal lines such as the scanning signal lines and the video signal lines are made of metal material. Therefore, the regions where the signal lines have been formed as seen in plan view are lower in optical transmittance than the regions where no such signal lines have been formed.

In the liquid crystal display device thus configured, the alignment control parts and the signal lines are overlapped with each other as seen in plan view.

This makes it possible to reduce the area as seen in plan view of a region in each picture element that is low in optical transmittance or that exerts a harmful influence on a display.

As a result, the foregoing configuration allows a liquid crystal display device provided with alignment control section to achieve a bright, high-quality display with a high aperture ratio by suppressing a decrease in aperture ratio.

Further, the liquid crystal display device according to the present invention may be configured such that: the picture element electrodes have a greater length along the scanning signal lines than a length that the picture element electrodes have along the video signal lines; the scanning signal lines are overlapped with the picture element electrodes via the insulating material in plan view; and the alignment control parts and the scanning signal lines are at least partially overlapped with each other as seen in plan view.

According to the foregoing configuration, the picture element electrodes have a greater length along the scanning signal lines than a length that the picture element electrodes have along the video signal lines. That is, the foregoing configuration is a configuration of so-called horizontally long picture element electrodes. As described above, such a configuration allows a reduction in number of video signal lines.

Since the number of video signal line drivers that are generally high in power consumption and manufacturing cost can be reduced, a liquid crystal display device low in manufacturing cost and power consumption can be achieved by curbing the number of drivers and the cost of mounting them.

Further, the liquid crystal display device according to the present invention may be configured such that the alignment control parts are projections.

Further, the liquid crystal display device according to the present invention may be configured such that the alignment control parts are notches cut in the picture element electrodes.

Further, the liquid crystal display device according to the present invention may be configured such that the alignment control parts are notches cut in the common electrode.

According to the foregoing configuration, the alignment control parts can be easily formed simply by adding molded objects such as projections to the substrate or cutting notches in the electrode(s) while patterning the electrode(s).

Further, the projections may be formed in such a way to be in contact with a film surface (alignment film surface) of the opposite substrate. In this case, the projections functions not only as alignment control parts but also as spacers for holding the substrates with a gap therebetween. This eliminates the need to separately provide spacers for keeping a cell gap, and also eliminates the need to scatter spacers such as plastic beads in laminating the substrates. This also allows a reduction in manufacturing cost.

Further, the liquid crystal display device according to the present invention may be configured such that: the picture elements are each divided into a plurality of subpixels; the picture element electrodes are each divided into a plurality of subpixel electrodes corresponding to the subpixels; and the subpixel electrodes are electrically connected to each other through subpixel electrode connecting parts.

According to the foregoing configuration, how the liquid crystal molecules contained in the liquid crystal material are aligned can be controlled in each of the plurality of regions into which the picture elements have each been divided.

This makes it possible to design a liquid crystal display device high in degree of freedom according to required display characteristics such as an aperture ratio and a response speed.

Further, the liquid crystal display device according to the present invention may be configured such that the subpixel electrode connecting parts and the scanning signal lines are at least partially overlapped with each other via the insulating layer as seen in plan view.

Further, the liquid crystal display device according to the present invention may be configured such that the subpixel electrode connecting parts have regions overlapped with the scanning signal lines and covering the scanning signal lines.

According to the foregoing configuration, the subpixel electrode connecting parts and the scanning signal lines are overlapped with each other as seen in plan view or, more preferably, the scanning signal lines are covered by the subpixel electrode connecting parts.

In other words, at least a part of the edge side of the scanning signal lines is overlapped with the subpixel electrode connecting parts as seen in plan view.

This makes it possible to prevent a defective display (decrease in contrast) such as light leakage from occurring due to a disturbance in alignment of the liquid crystal molecules under the influence of an oblique electric field generated from the edge side of the scanning signal lines.

Further, the liquid crystal display device according to the present invention may be configured such that: the picture element electrodes are overlapped with the scanning signal lines via the insulating material as seen in plan view; and with attention focused on one of the plurality of picture element electrodes, the picture element electrode is driven by that one of the scanning signal lines with which the picture element electrode is overlapped.

The foregoing configuration makes it possible to suppress occurrence of a problem that tends to be presented when a picture element electrode is driven by an adjacent scanning signal line.

That is, when a picture element electrode is driven by an adjacent scanning signal line, a switching element connected to the picture element electrode tends to be overlapped with an adjacent picture element electrode. This makes it likely for a parasitic capacitance to be generated between the adjacent picture element electrodes.

On the other hand, in such a configuration of the present invention, the picture element is driven by a scanning signal line overlapped therewith; therefore, such a parasitic capacitance is unlikely to be generated.

Further, the liquid crystal display device according to the present invention may be configured such that: the first substrate has storage capacitor lines and storage capacitor counter electrodes formed thereon; and each of the storage capacitor lines has a main portion formed in a region between those ones of the picture element electrodes which are adjacent to each other as seen in plan view.

Further, the liquid crystal display device according to the present invention may be configured such that: with attention focused on one of the plurality of picture element electrodes, that one of the storage capacitor lines which faces that one of the storage capacitor counter electrodes which is in connection with the picture element electrode is overlapped with the picture element electrode as seen in plan view, whereas that one of the storage capacitor lines which does not face that one of the storage capacitor counter electrodes which is in connection with the picture element electrode is not overlapped with the picture element electrode as seen in plan view.

According to the foregoing configuration, each storage capacitor line is provided between adjacent picture element electrodes; therefore a decrease in aperture ratio can be prevented from being caused by forming the storage capacitor lines.

Furthermore, since that one of the storage capacitor lines which does not face that one of the storage capacitor counter electrodes which is in connection with the picture element electrode is not overlapped with the picture element electrode, a change in potential can be prevented from being caused by an adjacent storage capacitor counter electrode storage connected to an adjacent picture element, i.e., by capacity coupling with the adjacent picture element.

Further, the liquid crystal display device according to the present invention may be configured such that the first substrate is provided with a reflecting film.

Further, the liquid crystal display device according to the present invention may be configured such that the reflecting film and the switching elements are overlapped with each other as seen in plan view.

Further, the liquid crystal display device according to the present invention may be configured such that the reflecting film and the scanning signal lines are overlapped with each other as seen in plan view.

According to the foregoing configuration, the first substrate is provided with a reflecting film; therefore, a transflective liquid crystal display device can be achieved.

Further, since the reflecting film is overlapped, as seen in plan view, with a switching element and scanning signal lines that generally have light-shielding properties, a decrease in aperture ratio can be prevented from being caused by providing the reflecting film.

Furthermore, when a reflecting film put on a switching element functions as a light-shielding film against external light incident upon the switching element. External light incident upon the semiconductor layer of a switching element causes a conduction phenomenon that leads to deterioration in off-characteristics. Therefore, it is desirable that a light-shielding film be put on the switching element. However, the present configuration eliminates such need to separately provide a light-shielding film. Furthermore, because the reflecting film is put on a substrate on which the switching element is placed, there is no need to reckon with an alignment displacement during lamination, as compared with a case where the reflecting film is put on the other substrate. This eliminates the need to provide an unnecessarily large reflecting film, thereby making it possible to avoid a decrease in aperture ratio.

In a liquid crystal display device according to the present invention, as described above, at least either the first substrate or the second substrate has regions corresponding to the picture elements and provided with alignment control parts for controlling how the liquid crystal material is aligned, at least either the scanning signal lines or the video signal lines are overlapped with the picture element electrodes via an insulating material as seen in plan view, and the alignment control parts and the signal lines overlapped with the picture element electrodes are at least partially overlapped with each other as seen in plan view.

This brings an effect of allowing a liquid crystal display device provided with alignment control section to achieve a bright, high-quality display with a high aperture ratio by suppressing a decrease in aperture ratio.

BRIEF DESCRIPTION OF DRAWINGS

FIG. 1 schematically shows the configuration of a liquid crystal display device according to an embodiment of the present invention.

FIG. 17 is a plan view schematically showing the configuration of a liquid crystal display device.

REFERENCE SIGNS LIST

Figure 2:
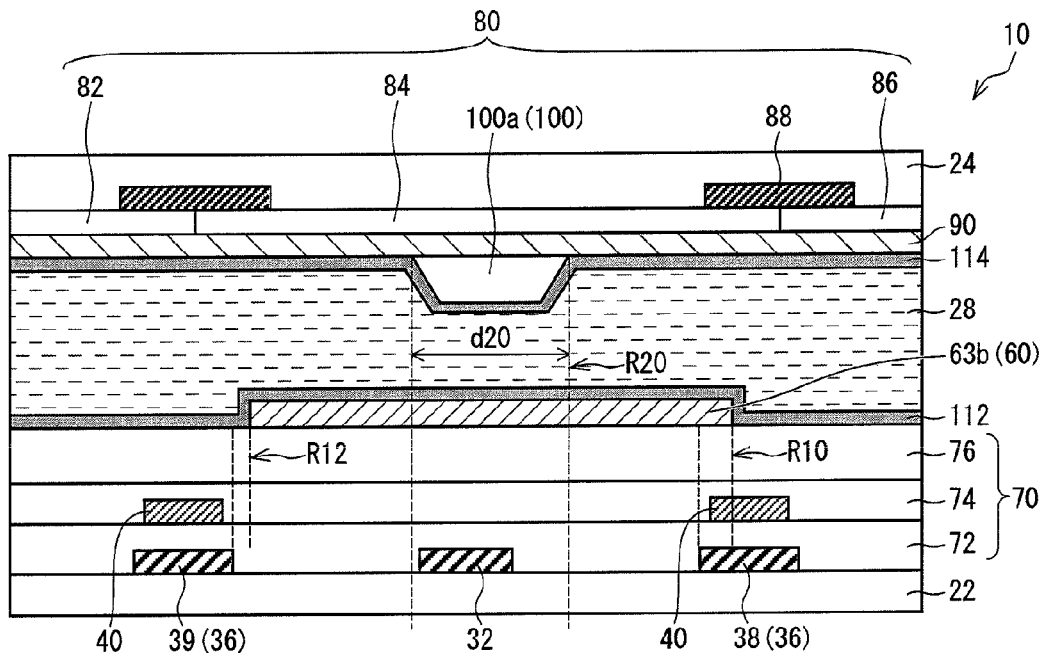
FIG. 2 is a cross-sectional view taken along line A-A of FIG. 1.

10 Liquid crystal display device
14 Picture element
15 Subpixel
16 Pixel
22 First substrate
24 Second substrate
28 Liquid crystal material
32 Scanning signal line
35 Video signal line
36 Storage capacitor line
38 Drive storage capacitor line (storage capacitor line)
39 Adjacent storage capacitor line (storage capacitor line)
40 Storage capacitor counter electrode
50 Switching element
60 Picture element electrode
63 Subpixel electrode
65 Subpixel electrode connecting part
70 Insulating film (insulating material)
90 Common electrode
100 Alignment control part
100a Rib (alignment control part)
100b Notch (alignment control part)
100c Notch (alignment control part)
130 Reflecting film

DETAILED DESCRIPTION OF THE INVENTION

[Embodiment 1]

An embodiment of the present invention is described below with reference to the drawings.

(Schematic Configuration of Each Picture Element)

FIG. 1 schematically shows the configuration of a liquid crystal display device 10 according to the present embodiment.

As shown in FIG. 1, the liquid crystal display device 10 according to the present embodiment is a so-called active-matrix liquid crystal display device 10 that, as described above, has picture elements 14 respectively provided with switching elements 50. Specifically, the picture elements 14 are respectively provided with TFT (thin-film transistor) elements serving as the switching elements 50 (gate electrodes 52, source electrodes 54, drain electrodes 56).

The switching element 50 are controlled by providing a plurality of scanning signal lines 32 and a plurality of video signal lines 35 intersecting with each other. The switching elements 50 are provided at points of intersection between the scanning signal lines 32 and the video signal lines 35.

Further provided are storage capacitor lines 36 that extend in parallel with the scanning signal lines 32.

The picture elements 14 correspond to rectangular regions defined by the video signal lines 35 and the storage capacitor lines 36, and these regions are provided with picture element electrodes 60. That is, in the present embodiment, the picture elements 14 do not correspond to regions defined by the video signal lines 35 and the scanning signal lines 32, and each of the scanning signal lines 32 is provided inside of the picture elements 14 that it drives.

Specifically, each of the scanning signal lines 32 is located in substantially the middle of a space between its adjacent storage capacitor lines 36. As a result, the scanning signal line 32 is located in substantially the middle position on the picture elements 14 along the video signal lines 35 (along the Y axis of FIG. 1 (longitudinally)) in such a way as to extend in parallel to the storage capacitor lines 36 (along the X axis of FIG. 1 (transversely)).

(Horizontally Long Electrodes)

Moreover, in the present embodiment, each of the picture element electrodes 60 has a horizontally long shape.

That is, in the liquid crystal display device 10 according to the present embodiment, the scanning signal lines 32 and the storage capacitor lines 36 extend transversely (along the X axis), and the video signal lines 35 extend longitudinally (along the Y axis). Moreover, because of the relationship between the storage capacitor lines 36 and the video signal lines 35 by which the picture elements 14 are defined, the distance between adjacent video signal lines 35 is longer than the distance between adjacent storage capacitor lines 36.

As a result, each of the picture elements 14 substantially defined by the storage capacitor lines 36 and the video signal lines 35 has a horizontally long shape; accordingly, each of the picture element electrodes 60 also has a horizontally long shape.

(Subpixels)

The configuration of each of the picture elements 14 is described in more detail.

The liquid crystal display device 10 according to the present embodiment has its picture elements 14 each divided into three subpixels (subpixels 15a, 15b, and 15c).

That is, each of the horizontally long picture elements 14 is divided evenly into three subpixels 15 arranged along the longer sides of the horizontally long picture element 14.

Moreover, each of the picture element electrodes 60 is also divided substantially evenly into three subpixel electrodes 63a, 63b, and 63c corresponding to the subpixels 15a, 15b, and 15c.

Specifically, each of the subpixel electrodes 63 is in semi-square form. Provided in a space between the subpixel electrodes 63a and 63b and a space between the subpixel electrodes 63b and 63c are cut-out regions R1 obtained by cutting into the picture element electrode 60.

Moreover, the subpixel electrodes 63a and 63b, separated from each other by the cut-out region R1, are connected to each other through a subpixel electrode connecting part 65, whereby the three subpixels are electrically connected to the drain electrode 56 of the TFT through at least one contact hole.

Similarly, the subpixel electrodes 63b and 63c are connected to each other through a subpixel electrode connecting part 65.

It should be noted here that each of the subpixel electrode connecting parts 65 is a metal wire, made of the same material at the same level as the picture element electrode 60, which extends along the longer sides of the horizontally long picture element 14, i.e., along the X axis. Moreover, each of the subpixel electrode connecting parts 65, provided between adjacent subpixel electrodes 63 in such a way as to be located in that portion of the picture element electrode 60 where the cut-out region R1 has been formed, serves to electrically connect the subpixel electrodes 63.

Moreover, in the present embodiment, each of the subpixel electrode connecting parts 65 is located in substantially the center of the horizontally long picture element 14 along the shorter sides of the horizontally long picture element 14 in such a way as to extend substantially in parallel with the longer sides of the horizontally long picture element 14.

The positions where the subpixel electrode connecting parts 65 are provided are described in relationship to the alignment control parts 100 to be described later.

(Examples of Dimensions)

The following describes examples of dimensions of each wire in the liquid crystal display device 10 according to the present embodiment. It should be noted that each dimension described below is an example, without imposing any limitations on such a configuration.

First, the picture element electrodes 60 are described. In the present embodiment, each of the picture elements 14 is divided into three subpixels as described above; accordingly, each of the picture element electrodes 60 is also divided into three subpixel electrodes 63.

Moreover, the length d1 of each subpixel electrode 63 along the Y axis is 59 um, and the length d2 of each subpixel electrode 63 along the X axis is 57 um.

Further, the length (length along the X axis) d3 of each subpixel electrode connecting part 65, through which the subpixel electrodes 63 are connected, is 8.5 um, and the width (length along the Y axis) d4 of each subpixel electrode connecting part 65 is 10 um. It should be noted here that the length (length along the X axis) d3 of each subpixel electrode connecting part 65 is equal to the width (length along the X axis) of each cut-out region R1, which separate the adjacent subpixel electrodes 63 from each other.

Next, each wire is described. First, the width d11 of each scanning signal line 32 is 6 um, and the width d12 of each video signal line 35 is 4 um; the width d13 of each storage capacitor line 36 is 7 um, and the width d14 of each storage capacitor counter electrode 40 is 4 um.

The dimensions are not limited to these values. For example, the width d4 of each subpixel electrode connecting part 65 can be 7 um, and the width d13 of each storage capacitor line 36 can be 5 um.

(Cross-Sectional Structures)

Next, the cross-sectional structure of the liquid crystal display device 10 according to the present embodiment and, in particular, the alignment control parts 100 are described with reference to FIG. 2, which is a cross-sectional view taken along line A-A of FIG. 1.

As schematically shown in cross-section in FIG. 2, the liquid crystal display device 10 according to the present embodiment includes two substrates opposed to each other (first substrate 22, second substrate 24) and a liquid crystal material 28 sandwiched between the two substrates.

Further, the liquid crystal display device 10 is provided with columnar spacers 120 (FIG. 1) to control the gap between the first substrate 22 and the second substrate 24. Specifically, as shown in FIG. 1, the columnar spacers 120 are provided in the four corners of each horizontally long picture element 14 in such a way as to be in a region that does not contribute to a display.

(First Substrate)

Moreover, the first substrate 22, which is a so-called array substrate, has the scanning signal lines 32 and the storage capacitor lines 36 formed thereon. Further formed thereon is a gate insulating film 72 constituting an insulating film 70.

Further formed on the gate insulating film 72 in such a way as to be in positions overlapped with the storage capacitor lines 36 as seen in plan view are storage capacitor counter electrodes 40.

Further formed above the storage capacitor counter electrodes 40 are picture element electrodes 60, with protective films 74 and 76 sandwiched therebetween to function as an interlayer insulating film.

Further provided on the picture element electrodes 60 in such a way as to be at the interface between the picture element electrodes 60 and the liquid crystal material 28 is an alignment film 112.

The scanning signal lines 32 and the storage capacitor lines 36 are both made of so-called G-layer (gate layer) metal M1 at the same level on the first substrate. Examples of the G-layer metal M1 include TiN/Ti/Al and the like.

Further, the storage capacitor counter electrodes 40 are made of so-called S-layer (source layer) metal M2 at the same level as the video signal lines 35 above the first substrate. Examples of the S-layer metal M2 include Mo/MoN/Al/MoN and the like.

Further, the insulating film 70, such as the protective film 74, can be made of any insulating material that has insulating properties, and can be made as a single inorganic film, a single organic film, or a two-layer film consisting of an organic layer and an inorganic layer.

(Second Substrate)

Next, the second substrate is described.

The second substrate 24, which is a so-called color-filter substrate, has a black matrix 88 formed to correspond to the picture elements and a color filter 80 formed to correspond to the colors. Further formed on the color filter 80 are a common electrode 90.

Further formed on the common electrode 90 in such a way as to be at the interface between the common electrode 90 and the liquid crystal material 28 is an alignment film 114.

(Alignment Control Parts)

The alignment control parts 100 according to the present embodiment are described below.

There are provided projections (ribs) in those positions on the second substrate 24 according to the present embodiment which correspond to the subpixel electrodes 63, and it is these projections that function as the alignment control parts 100.

Specifically, the liquid crystal display device 10 according to the present embodiment is of the so-called VA (vertically aligned) mode. Provision of the alignment control parts 100 makes it easy for liquid crystal molecules contained in the liquid crystal material 28 to continuously change omnidirectionally from one direction of alignment to another. Further, because in the VA mode the alignment films 112 and 114 are not finished with alignment treatment such as rubbing, the alignment control parts 100 play a more important role.

More specifically, as shown in FIGS. 1 and 2, each of the projections is in substantially the shape of a truncated six-sided pyramid. Moreover, as shown in FIG. 1, the distance (d20 from one side of each rib to the other side) between two opposed parallel sides at the base of the truncated hexagonal pyramid is 13 um.

The projections, which serve as the alignment control parts 100, are not limited in shape to the aforementioned shape, and may be of various shapes such as a cone, a truncated cone, a triangular pyramid, and a column. Further, the projections are not limited in size to the aforementioned size, and may be of various sizes.

Further, the alignment control parts do not necessarily need to be formed on the second substrate 24, and may be formed, for example, on the first substrate 22.

Further, the mode of alignment of liquid crystals is not limited to the VA mode, and may be another mode such as the OCB (optically self-compensated birefringence) mode. For example, when the liquid crystal display device 10 is of the OCB mode, the alignment control parts 100 may be used as bend nucleus generating means for generating a transition from splay alignment to bend alignment. In this case, the alignment control parts 100 may be formed as notches in the electrode(s) as will be described later.

(Alignment Control Parts and Scanning Signal Lines)

Next, the positional relationship between the alignment control parts 100 and the scanning signal lines 32 according to the present embodiment is described.

In the liquid crystal display device according to the present embodiment, as shown in FIG. 1, the alignment control parts 100 and the scanning signal lines 32 are overlapped with each other as seen in plan view. Specifically, as shown in FIG. 2, each of the scanning signal lines 32 lies within a region (region R20 shown in FIG. 2) underneath its corresponding alignment control parts 100. That is, each of the scanning signal lines 32 does protrude from its corresponding alignment control parts 100 across the width of the scanning signal line 32 as seen in plan view.

The positional relationship between the alignment control parts 100 and the scanning signal lines 32 is not limited to that described above. For example, the scanning signal lines 32 may be partially overlapped with the alignment control parts 100 as seen in plan view.

(Scanning Signal Lines and Subpixel Electrode Connecting Parts)

Next, the positional relationship between the scanning signal lines 32 and the subpixel electrode connecting parts 65 according to the present embodiment is described.

That is, as shown in FIG. 1, the scanning signal lines and the subpixel electrode connecting parts 65 are overlapped with each other. Specifically, each of the scanning signal lines 32 lies within a region underneath its corresponding subpixel electrode connecting parts 65. That is, each of the scanning signal lines 32 does not protrude from the widthwise sides of its corresponding subpixel electrode connecting parts 65 across the width of the scanning signal line 32 as seen in plan view. In other words, in a region where each of the scanning signal lines 32 and its corresponding subpixel electrode connecting parts 65 are overlapped with each other, the scanning signal line 32 is covered by its corresponding subpixel electrode connecting parts 65 as seen in plan view.

Each of the subpixel electrode connecting parts may be easily affected by an alignment control part corresponding to subpixels provided on both sides of the subpixel electrode connecting part, and therefore may cause the liquid crystal molecules to be aligned along an undesirable direction. In a display device of which a high-quality display such as a high contrast is required, it is desirable that the subpixel connecting parts be shielded from light so as not to contribute to a display. Furthermore, in order to preferably eliminate the need to reckon with an alignment displacement during lamination, it is desirable that the subpixel connecting parts be shielded from light by a light-shielding layer provided on the substrate on which the subpixel connecting parts have been formed.

(Storage Capacitor Lines)

Next, the storage capacitor lines 36 are described. As described above, the storage capacitor lines 36 according to the present embodiment extend along the X axis, i.e. transversely. Moreover, each of the storage capacitor lines 36 has its main portion located in a region between picture elements 14 (picture element electrodes 60) adjacent to each other along the Y axis, i.e. longitudinally, as seen in plan view. Further, each of the storage capacitor lines 36 forms a storage capacitor in combination with a storage capacitor counter electrode 40 formed in a higher position corresponding to the storage capacitor line 36 via the gate insulating film 72.

The following gives a further explanation with reference to FIG. 2.

Let it be assumed that the storage capacitor lines 36 are classified into a driving storage capacitor line 38, which is a storage capacitor line 36 corresponding to a picture element 14 (corresponding picture element) (which is opposed to a storage capacitor counter electrode electrically connected to the corresponding picture element), and an adjacent storage capacitor line 39, which is a storage capacitor line 36 corresponding to an adjacent picture element 14. Then, although both the driving storage capacitor line 38 and the adjacent storage capacitor line 39 have their respective main portions each formed in a region between adjacent picture elements 14, the driving storage capacitor line 38 is overlapped with a picture element electrode 60 differently from the adjacent storage capacitor line 39.

Specifically, while the driving storage capacitor line 38 is overlapped with the picture element electrode 60 (see a region R10 shown in FIG. 2), the adjacent storage capacitor line 39 is not overlapped with the picture element electrode 60 (see a region R12 shown in FIG. 2).

It should be noted that each of the storage capacitor counter electrodes 40 is connected to a picture element electrode 60 to be equal in potential to the picture element electrode 60.

Figure 3:
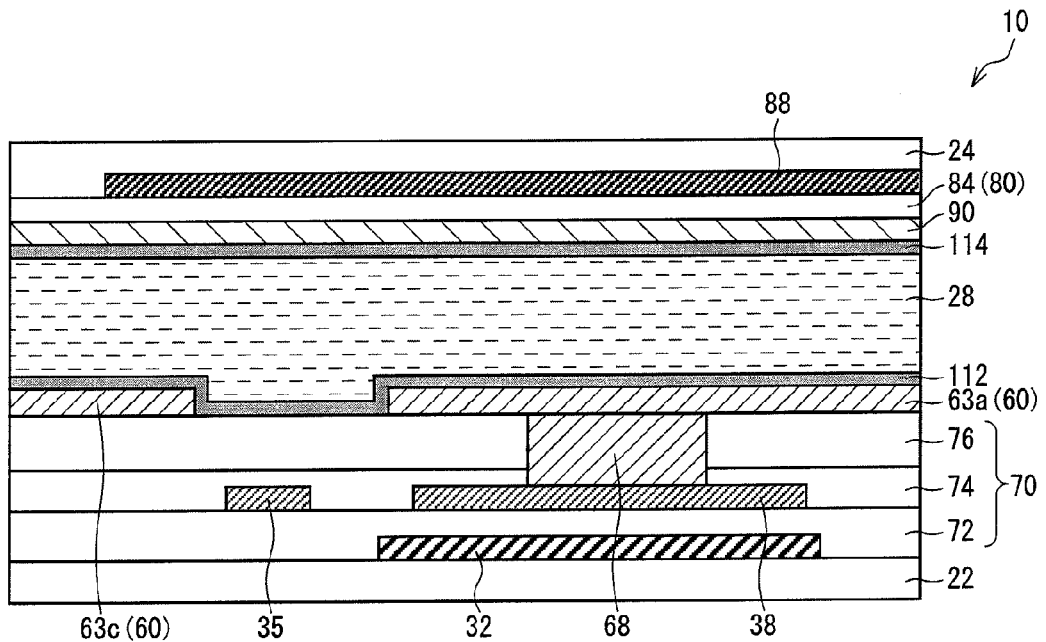
FIG. 3 is a cross-sectional view taken along line B-B of FIG. 1.

That is, as shown in FIG. 3, which is a cross-sectional view taken along line B-B of FIG. 1, the picture element electrode 60 and the storage capacitor counter electrode 40 are electrically connected to each other through a contact hole 68 passing through the protective films 74 and 76.

(Other Arrangements of Subpixels)

Examples of how the subpixels are arranged are described with reference to FIGS. 4 through 7. Each of FIGS. 4 through 7 schematically shows the configuration of a liquid crystal display device 10 with a different arrangement of subpixels.

Figure 4:
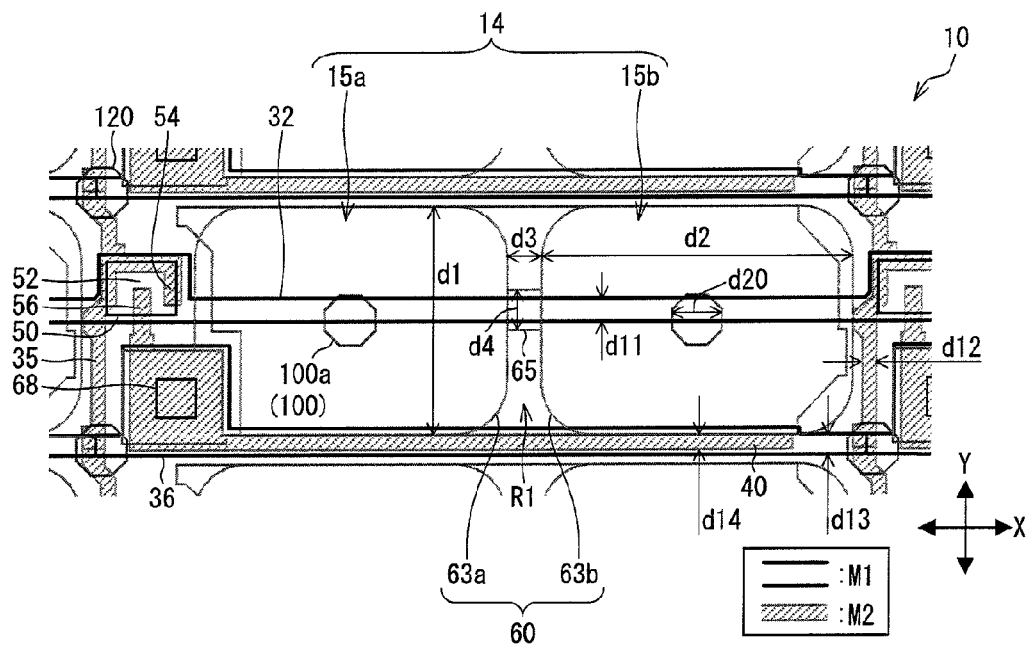
FIG. 4 schematically shows the configuration of a liquid crystal display device according to an embodiment of the present invention.

That is, in the liquid crystal display device 10 of FIG. 4, each picture element 14 is divided into two subpixels 15 arranged along the X axis; accordingly, each picture element electrode 60 is also divided into two subpixel electrodes 63.

Moreover, the two subpixel electrodes 63a and 63b are connected to each other through a subpixel electrode connecting part 65.

Further, the subpixels 15 are provided with ribs 100a located in positions corresponding substantially to the center of the respective subpixel electrodes 63 to serve as such alignment control parts 100 as described above.

Figure 5:
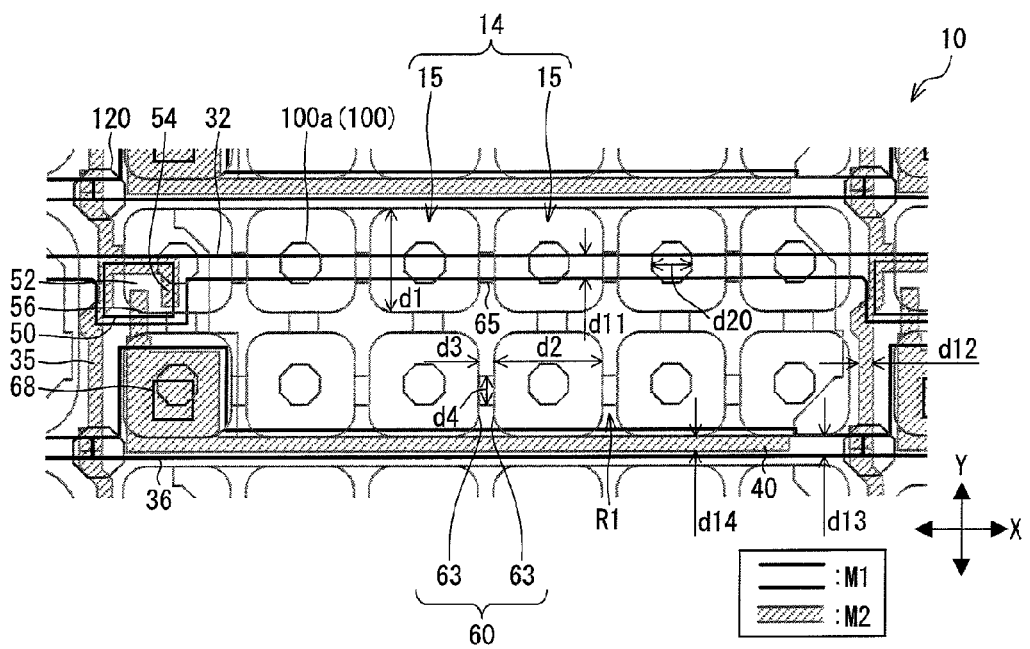
FIG. 5 schematically shows the configuration of a liquid crystal display device according to an embodiment of the present invention.
Figure 6:
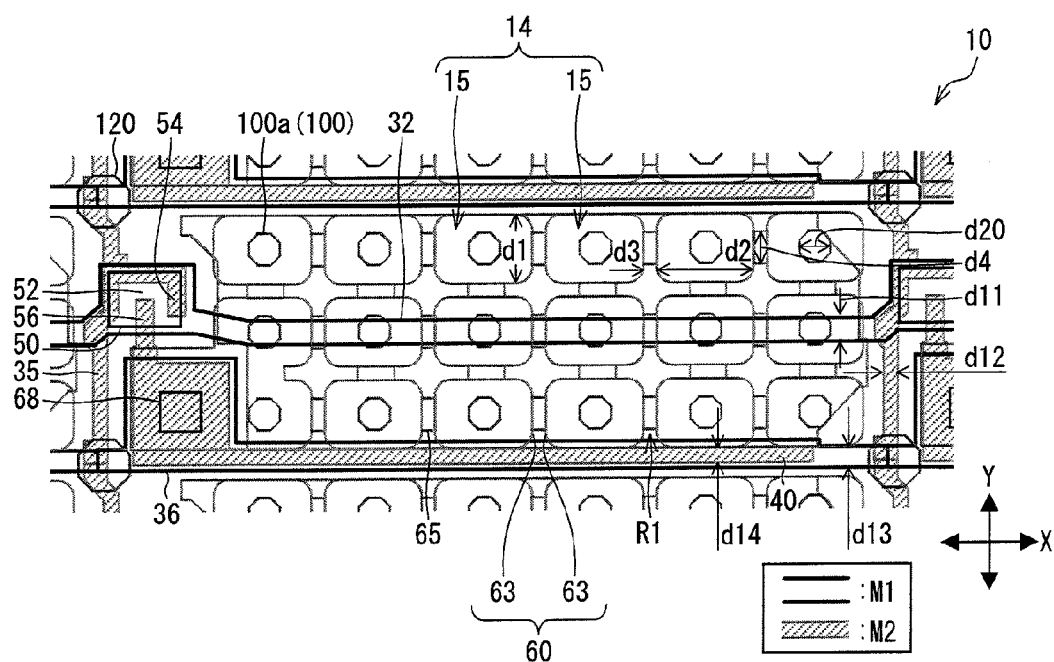
FIG. 6 schematically shows the configuration of a liquid crystal display device according to an embodiment of the present invention.

Other possible examples of how the subpixels 15 are arranged are shown in FIGS. 5 and 6.

That is, in the liquid crystal display device 10 of FIG. 5, each picture element 14 is divided into six subpixels 15 arranged along the X axis, and then is divided into two subpixels 15 arranged along the Y axis, whereby each picture element 14 is divided into twelve subpixels 15.

Accordingly, each picture element electrode 60 is also divided into twelve subpixel electrodes 63.

Moreover, each of the subpixel electrodes 63 are connected to its adjacent subpixel electrodes 63 through such subpixel electrode connecting parts 65 as described above.

In the example shown in FIG. 5, the plurality of subpixel electrodes 63 are arranged along the Y axis as well as the X axis. Accordingly, the subpixel electrode connecting parts 65 are also provided to extend along the Y axis as well as unidirectionally (along the X axis) as shown in FIG. 4.

Further, in the example shown in FIG. 6, each picture element 14 is divided into six subpixels 15 arranged along the X axis, and then is divided into three subpixels 15 arranged along the Y axis. Accordingly, each picture element electrode 60 is also divided into eighteen subpixels 63 that are smaller than those shown in FIG. 5.

Also in each of the configurations shown above by way of example, the subpixels 15 are provided with ribs 100a located in positions corresponding substantially to the center of the respective subpixel electrodes 63, into which the picture element electrode 60 has been divided, to serve as such alignment control parts 100 as described above.

Further, none of the examples imposes any limitation on the arrangement of subpixels 15 in each picture element 14, and the subpixels 15 can be arranged in other various ways.

Further, the number of subpixels into which each picture element is divided can be determined according to the characteristics of which the liquid crystal display device is required.

Specifically, for example, more emphasis on the aperture ratio than on the response speed can be achieved by a smaller number of larger subpixels.

On the other hand, it is possible, for example, that more emphasis on the response speed than on the aperture ratio can be achieved by a larger number of smaller subpixels.

Further, the shape of each subpixel is not particularly limited, but is preferably in semi-square form. This is because when the subpixel is in semi-square the distance from the subpixel's alignment control part to the peripheral region of the subpixel varies less with the peripheral position. Such a configuration makes it possible to suppress occurrence of a disturbance in alignment of the liquid crystal material in each subpixel and, in particular a disturbance in alignment in the peripheral region.

(Without Subpixels)

Figure 7:
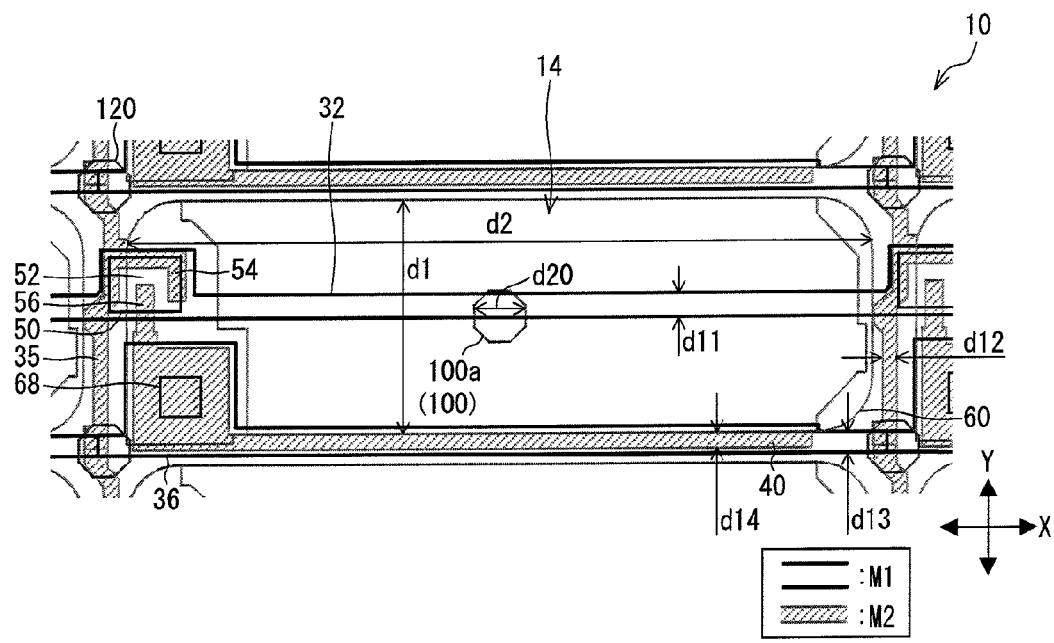
FIG. 7 schematically shows the configuration of a liquid crystal display device according to an embodiment of the present invention.

It is not necessary to divide each picture element 14 into a plurality of subpixels 15. For example, as shown in FIG. 7, each picture element 14 may be formed by a single picture element electrode 60.

In such a configuration without subpixel electrodes 63, there are provided no subpixel electrode connecting parts 65 for connecting one subpixel electrode 63 to another, either.

Further, each picture element 14 is provided with a rib 100a located in a position corresponding substantially to the center of the picture element electrode 60 to serve as an alignment control part 100.

[Embodiment 2]

Figure 8:
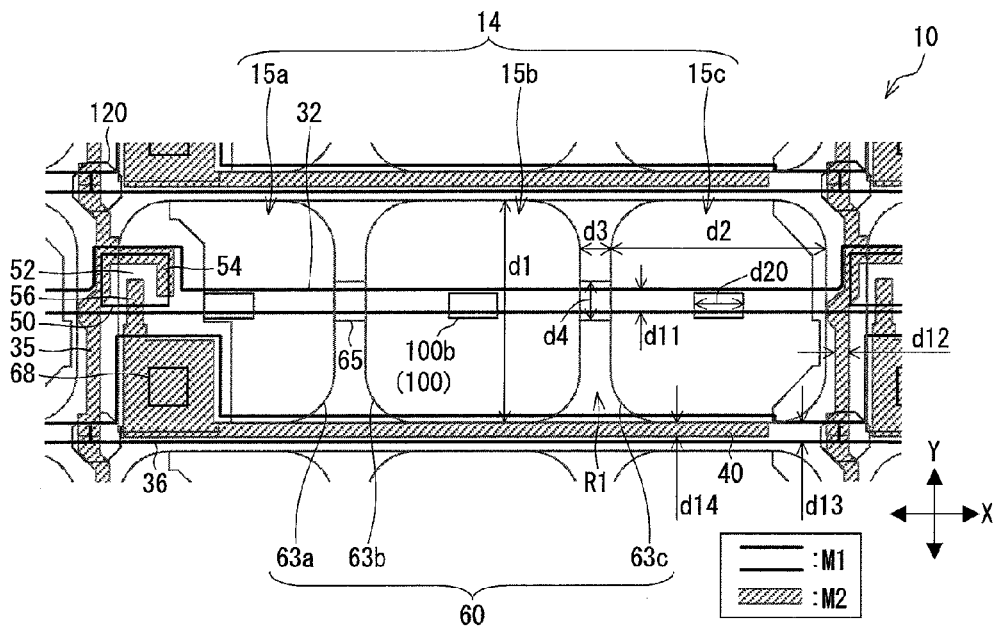
FIG. 8 schematically shows the configuration of a liquid crystal display device according to another embodiment of the present invention.

A second embodiment of the present invention is described below with reference to FIG. 8. FIG. 8 schematically shows the configuration of a liquid crystal display device according to another embodiment of the present invention.

The present embodiment is identical in structure to Embodiment 1 except for the following descriptions. Further, for convenience of explanation, members having the same functions as those shown in the drawings of Embodiment 1 are given the same reference numerals and will not be described below.

Figure 13:
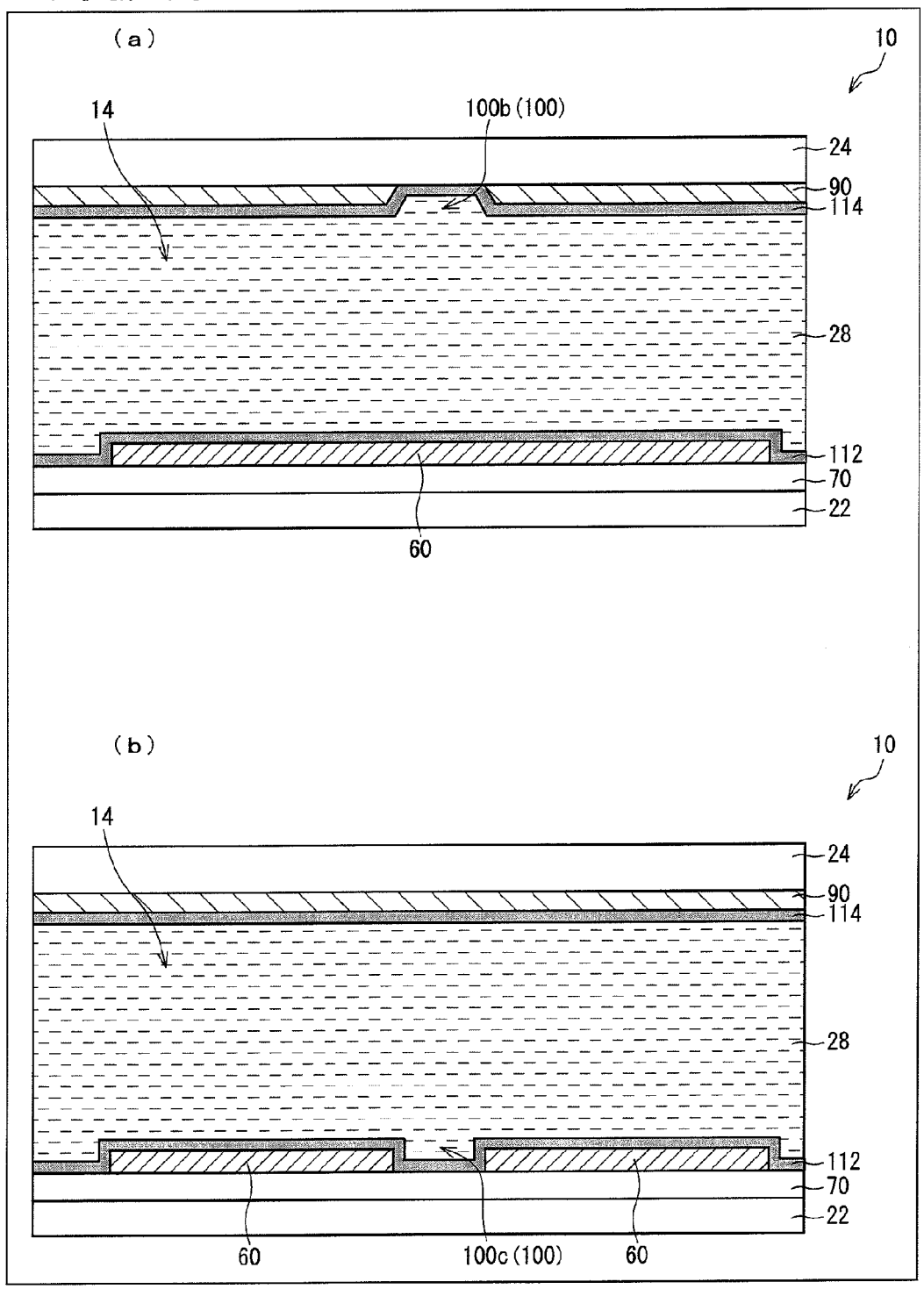
FIG. 13 includes (a) a cross-sectional view showing the configuration of a liquid crystal display device having notches formed in a common electrode and (b) a cross-sectional view showing the configuration of a liquid crystal display device having notches formed in picture element electrodes.
Figure 14:
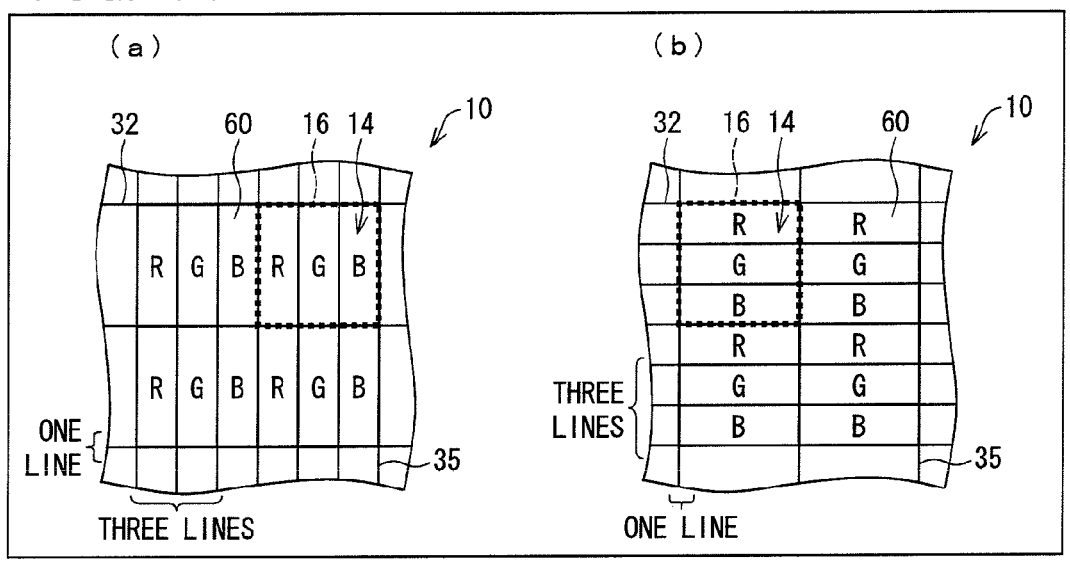
FIG. 14 shows (a) an arrangement of vertically long picture element electrodes and (b) an arrangement of horizontally long picture element electrodes.
Figure 15:
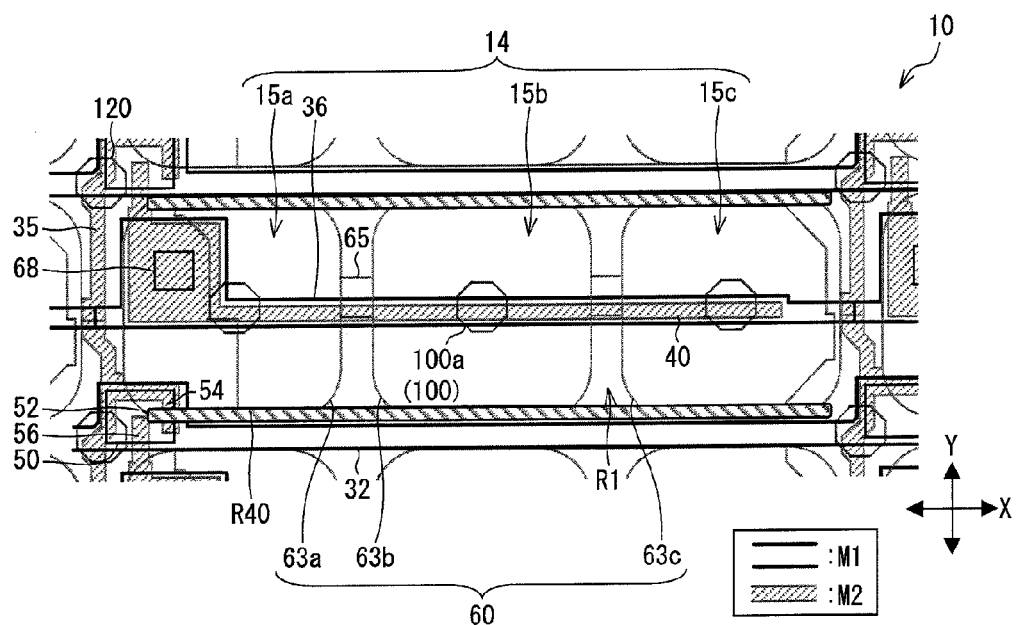
FIG. 15 schematically shows the configuration of a liquid crystal display device.
Figure 16:
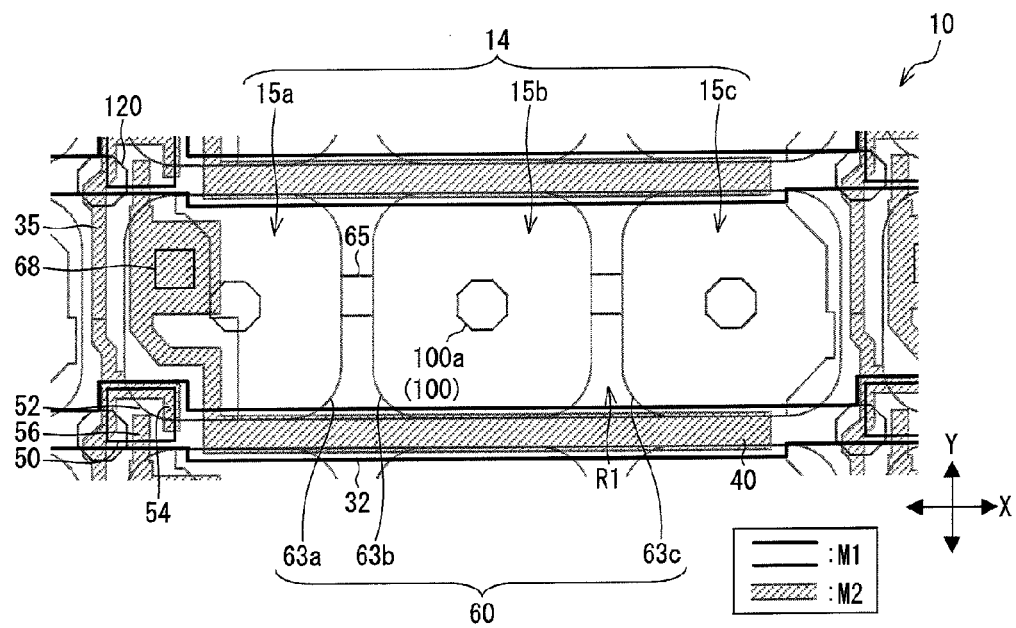
FIG. 16 schematically shows the configuration of a liquid crystal display device.

In comparison with the liquid crystal display device 10 according to Embodiment 1, a liquid crystal display device 10 according to the present embodiment differs in that the alignment control parts 100 do not take the form of ribs 100a, i.e. projections, but take the form of such notches in the electrode(s) as those described above with reference to (a) and (b) of FIG. 13.

Figure 12:
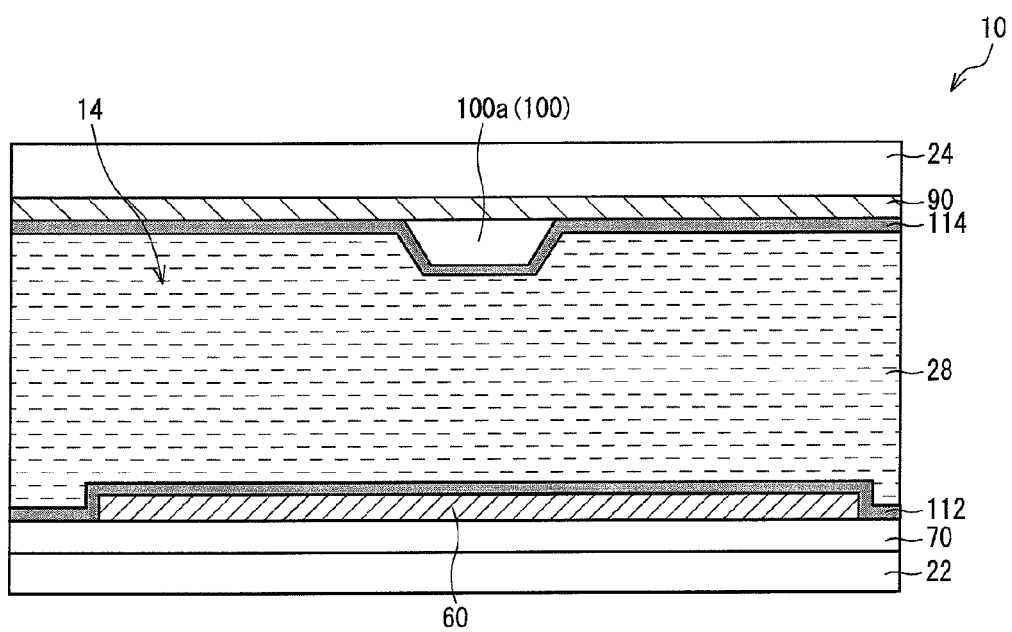
FIG. 12 is a plan view schematically showing the configuration of a liquid crystal display device.

That is, in Embodiment 1, the alignment control parts 100 take the form of such ribs 100a, i.e. projections, on the second substrate as those described with reference to FIG. 12.

On the other hand, in the present embodiment, the alignment control parts 100 take the form of such notches 100b in the common electrode 90 as those shown above in (a) of FIG. 13.

Moreover, as with the ribs 100a described above, the notches 100b are located in positions corresponding substantially to the center of the respective subpixel electrodes.

(Shape of the Notches)

Further, the notches 100b are not limited in shape to such a rectangle as shown in FIG. 8, and may be of various shapes such as a square, a circle, a triangle, an X-shape, a cross, a V-shape, and a W-shape.

(Positions of the Notches)

The notches can be cut in the picture element electrodes 60 (subpixel electrodes 63) of the first substrate as described above with reference to (b) of FIG. 13, instead of being cut in the common electrode 90 of the second substrate 24.

[Embodiment 3]

Figure 9:
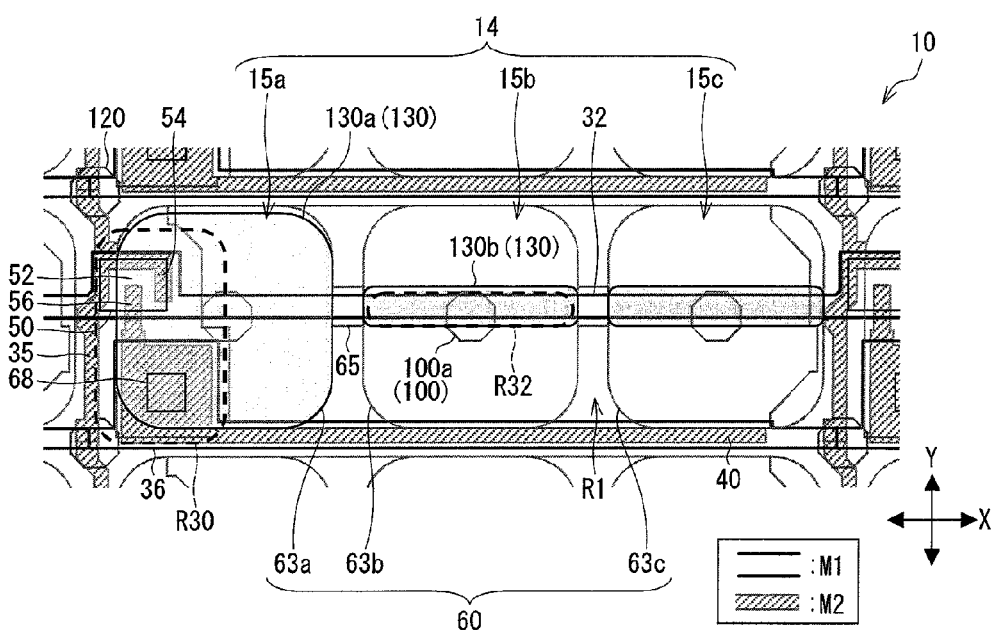
FIG. 9 schematically shows the configuration of a liquid crystal display device according to another embodiment of the present invention.

A third embodiment of the present invention is described below with reference to FIG. 9. FIG. 9 schematically shows the configuration of a liquid crystal display device according to another embodiment of the present invention.

The present embodiment is identical in structure to the embodiments above except for the following descriptions. Further, for convenience of explanation, members having the same functions as those shown in the drawings of the embodiment above are given the same reference numerals and will not be described below.

A liquid crystal display device 10 according to the present embodiment is characterized by being a transflective liquid crystal display device.

That is, each of the liquid crystal display devices 10 according to the embodiments above is a transmissive liquid crystal display device 10 having no light-reflecting layer formed inside thereof.

On the other hand, the liquid crystal display device 10 according to the present embodiment has reflecting films 130 provided in each picture element 14 as shown in FIG. 9, thereby enabling a reflective display using external light.

Moreover, the present embodiment is capable of a transflective display because each of the picture elements 14 has a region provided with such a reflecting film 130 and a region provided with no such reflecting film 130.

The following gives a specific explanation. In the liquid crystal display device 10 according to the present embodiment, the reflecting films 130 are classified into a reflecting film 130a and reflecting films 130b. The reflecting film 130a is different in shape from the reflecting films 130b.

Specifically, the reflecting film 130a is overlapped with a subpixel electrode 63a, i.e. one of the three subpixel electrodes 63, which is in connection with a TFT serving as such a switching element 50 as described above.

On the other hand, the reflecting films 130b are overlapped with subpixel electrodes 63 other than the subpixel electrode 63a of the three subpixel electrodes 63 or, specifically, with subpixel electrodes 63b and 63c. More specifically, the reflecting films 130b are overlapped with the scanning signal line 32 within the range of the subpixel electrodes 63b and 63c, respectively.

The present embodiment suppresses a decrease in aperture ratio by arranging the reflecting films 130 in their respective positions as described above.

That is, a region (see a region R30 shown in FIG. 9) provided with a TFT serving as such a switching element 50 as described above and a region (region R32 shown in FIG. 9) provided with such a scanning signal line 32 as described above are generally provided with metal wires and therefore are so-called non-aperture regions that do not contribute to a display.

The configuration, which has reflecting films 130 formed in a non-aperture region (R30) above a TFT and a non-aperture region (R32) above a scanning signal line, can prevent a decrease in aperture ratio from being caused by formation of reflecting films 130.

The places where the reflecting films 130 are formed and the shapes of the reflecting films 130 are not particularly limited to those described with reference to FIG. 9, etc.

Further, the level at which the reflecting films 130 are formed is not particularly limited; however, the reflecting films 130 can be formed, for example, between the protective film 76 and the subpixel electrodes 63 as shown in FIG. 2.

The present invention is not limited to the description of the embodiments above, but may be altered within the scope of the claims. An embodiment based on a proper combination of technical means disclosed in different embodiments is encompassed in the technical scope of the present invention.

Figure 10:
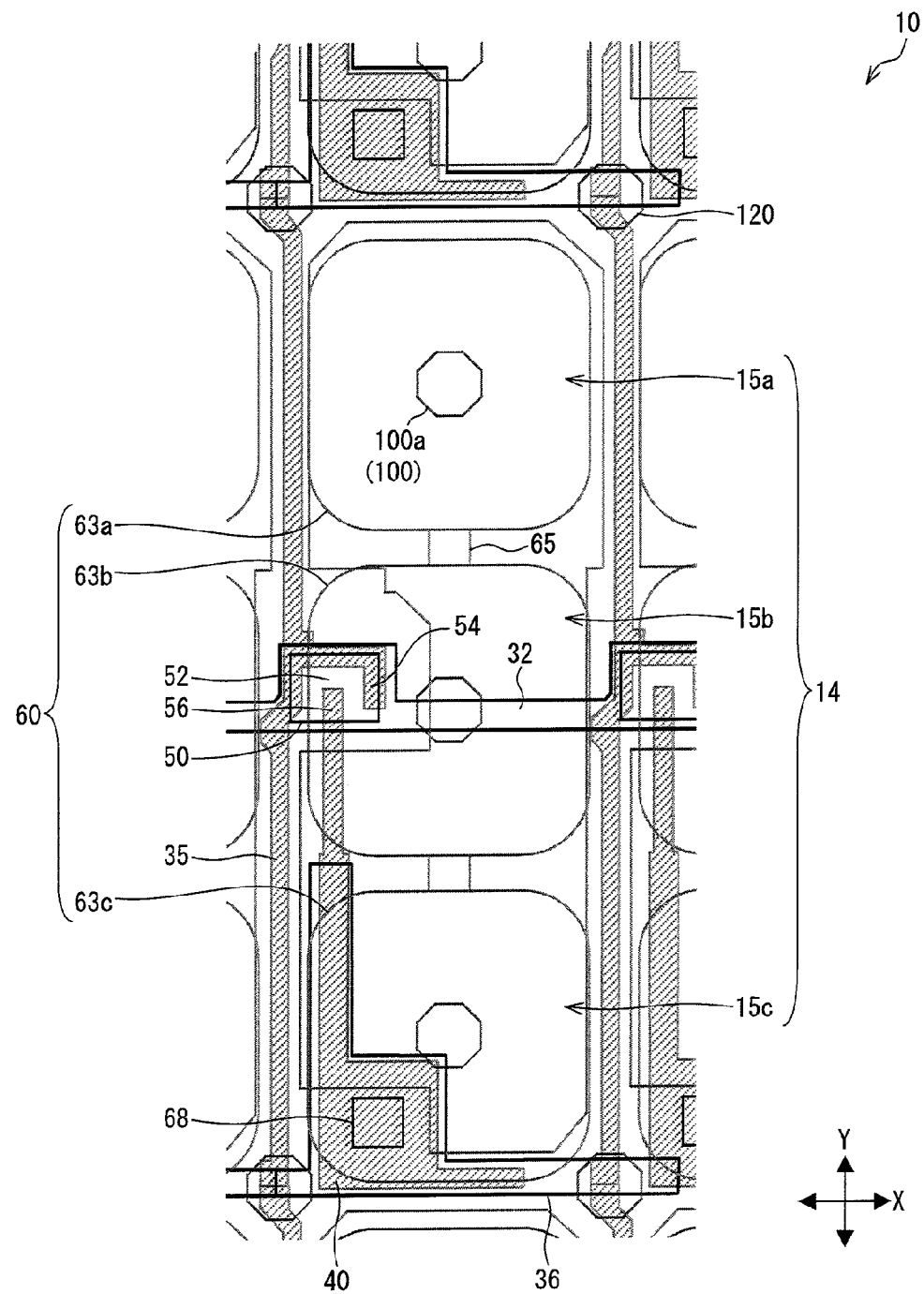
FIG. 10 schematically shows the configuration of a liquid crystal display device according to another embodiment of the present invention.

The foregoing description presupposes a configuration in which each picture element electrode has a horizontally long shape. However, a liquid crystal display device according to the present invention is not limited to such a configuration, and may be configured such that each picture element electrode has a vertically long shape. FIG. 10 schematically shows the configuration of a liquid crystal display device 10 including such vertically long picture element electrodes.

In the case of vertically long picture element electrodes 60, as shown in FIG. 10, the liquid crystal display device 10 appears as if the liquid crystal display device 10 of FIG. 1 had been turned substantially 90 degrees. The following gives concrete descriptions centered on differences between vertically long picture element electrodes and horizontally long picture element electrodes.

In the liquid crystal display device 10 of FIG. 10, the scanning signal lines 32 and the storage capacitor lines 36 extend along the X axis as they do in the configuration of horizontally long picture element electrodes; on the other hand, the video signal lines 35 extend along the Y axis. Moreover, the picture elements 14 correspond to regions defined by the storage capacitor lines 36 and the video signal lines 35. These regions have their longer sides extending along the Y axis (longitudinally).

Moreover, each of the vertically long picture elements 14 has three subpixels 15a, 15b, and 15c arranged in a straight line along the Y-axis, and has subpixel electrodes 63a, 63b, and 63c respectively corresponding to the subpixels 15a, 15b, and 15c. Further, each of the subpixel electrodes is connected to an adjacent subpixel electrode through a subpixel electrode connecting part 65 as in the case of horizontally long picture element electrodes.

Moreover, the scanning signal line 32 overlapped with the picture element electrode 60 is overlapped with the subpixel electrode 63b, which is located between the subpixel electrode 63a and 63c, as seen in plan view.

Further, in such a configuration having vertically long picture element electrodes, each of the storage capacitor counter electrodes 40 for forming storage capacitors extends from the drain electrode 56 of a TFT element serving as a switching element 50 formed on the subpixel 15a.

On the other hand, the width of each of the storage capacitor lines 36 is expanded into the subpixel 15c so that the storage capacitor line 36 is overlapped with its corresponding storage capacitor counter electrode 40 over a larger area.

In such a configuration of horizontally long picture element electrodes as described above, the number of video signal lines can be reduced, whereby the number of drivers therefor can be curbed.

That is, as shown in FIG. 17, which is a plan view schematically showing the configuration of a conventional liquid crystal display device 10 having vertically long picture element electrodes, the conventional liquid crystal display device, which has a connecting substrate 160 such as a flexible printed wiring board connected to a longer side thereof, has a scanning driver IC 152 and a plurality of driver ICs 154 for video signals provided at the edge of that longer side.

Figure 11:
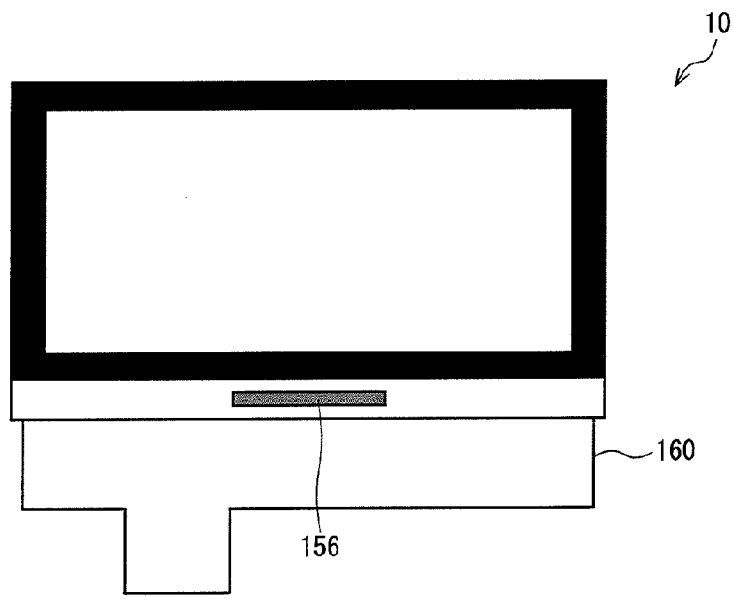
FIG. 11 is a plan view schematically showing the configuration of a liquid crystal display device.

On the other hand, as shown in FIG. 11, which is a plan view schematically showing the configuration of a liquid crystal display device 10 having horizontally long picture element electrodes, the liquid crystal display device 10 having horizontally long picture element electrodes allows a reduction in number of drivers for the video signal lines 35. Since the number of drivers can be reduced, the scanning driver IC 152 and the video signal driver ICs 154 can be integrated with each other to form a single driver IC, whereby the liquid crystal display device 10 can be simply configured to have such an integrated driver IC 156 for scanning and video signals provided at a longer side thereof.

Such simplification of a peripheral region brings about advantages, for example, in manufacture of a monolithic liquid crystal display device 10.

Although the foregoing description assumes that the subpixel electrode connecting parts are provided in a position corresponding to the center of the subpixel electrodes along the X axis or the Y axis, the position of the subpixel electrode connecting parts are not limited to such a position; for example, the subpixel electrode connecting parts can be provided to extend along the edge of the subpixel electrodes.

Although the foregoing description assumes that the alignment control parts such as ribs and notches are provided in a position corresponding to the center of the picture element electrode and subpixel electrodes 63, the position of the alignment control parts is not limited to such a position; any number of alignment control parts can be provided in any position.

Industrial Applicability

The present invention can be suitably used in comparatively small-sized liquid crystal display devices, such as cellular phones, PDAs (personal digital assistants), personal navigation systems, and portable video game machines, which are expected to be low in power consumption and high in display quality.

The invention claimed is:

1. A liquid crystal display device including a first substrate, a second substrate, and a liquid crystal material sandwiched between the first substrate and the second substrate,
   with picture elements arranged in a matrix,
   the first substrate being provided with:
   a plurality of scanning signal lines;
   a plurality of video signal lines intersecting with the scanning signal lines;
   a plurality of switching elements electrically connected to the scanning signal lines and the video signal lines;
   picture element electrodes electrically connected respectively to the switching elements and provided in such a way as to correspond respectively to the picture elements; and
   storage capacitor lines and storage capacitor counter electrodes,
   the second substrate being provided with a common electrode,
   the second substrate having regions corresponding to the picture elements and provided with alignment control parts for controlling how the liquid crystal material is aligned, a surface of each alignment control part being covered by an alignment film, the alignment control parts being provided between the common electrode and the alignment film,
   the scanning signal lines being overlapped with the picture element electrodes via an insulating material in plan view,
   the alignment control parts and the scanning signal lines overlapped with the picture element electrodes being at least partially overlapped with each other in plan view,
   wherein, in plan view, a scanning signal line is not provided between a picture element electrode and an adjacent picture element electrode adjacent to the picture element electrode in a first direction in which the scanning signal lines are aligned, but provided within the picture element electrode,
   wherein, the liquid crystal display device is a vertically aligned mode,
   wherein, in plan view, one of the storage capacitor lines has a main portion provided in a region between the picture element electrode and the adjacent picture element electrode in the first direction, and
   wherein, only one scanning signal line overlaps the picture element electrode, and the same scanning signal line that overlaps the picture element electrode also drives the picture element electrode.

2. The liquid crystal display device as set forth in claim 1, wherein:
   the picture element electrodes have a greater length along the scanning signal lines than a length that the picture element electrodes have along the video signal lines;
   the scanning signal lines are overlapped with the picture element electrodes via the insulating material in plan view; and
   the alignment control parts and the scanning signal lines are at least partially overlapped with each other in plan view.

3. The liquid crystal display device as set forth in claim 1, wherein the alignment control parts are projections.

4. The liquid crystal display device as set forth in claim 1, wherein the first substrate includes alignment control parts comprising notches cut in the picture element electrodes.

5. The liquid crystal display device as set forth in claim 1, wherein the alignment control parts are notches cut in the common electrode.

6. The liquid crystal display device as set forth in claim 1, wherein:
   the picture elements are each divided into a plurality of subpixels;
   the picture element electrodes are each divided into a plurality of subpixel electrodes corresponding to the subpixels; and
   the subpixel electrodes are electrically connected to each other through subpixel electrode connecting parts.

7. The liquid crystal display device as set forth in claim 6, wherein the subpixel electrode connecting parts and the scanning signal lines are at least partially overlapped with each other via the insulating layer in plan view.

8. The liquid crystal display device as set forth in claim 7, wherein the subpixel electrode connecting parts have regions overlapped with the scanning signal lines and covering the scanning signal lines.

9. The liquid crystal display device as set forth in claim 1, wherein in the picture element electrode, a storage capacitor line which faces one of the storage capacitor counter electrodes in connection with the picture element electrode is overlapped with the picture element electrode in plan view, and
   wherein another one of the storage capacitor lines which does not face the storage capacitor counter electrodes in connection with the picture element electrode is not overlapped with the picture element electrode in plan view.

10. The liquid crystal display device as set forth in claim 1, wherein the first substrate is provided with a reflecting film.

11. The liquid crystal display device as set forth in claim 10, wherein the reflecting film and the switching elements are overlapped with each other in plan view.

12. The liquid crystal display device as set forth in claim 10, wherein the reflecting film and the scanning signal lines are overlapped with each other in plan view.

13. The liquid crystal display device as set forth in claim 1, wherein:
   in plan view, each of the video signal lines has a main portion provided in a region between the picture element electrode and another picture element electrode provided adjacent to the picture element electrode in a second direction is which the video signal lines are aligned.

14. The liquid crystal display device as set forth in claim 1, wherein:
the insulating material provided between the scanning signal lines and the picture element electrodes includes at least three insulating films.

15. The liquid crystal display device as set forth in claim 14, wherein:
one of the three insulating films is an organic film.

16. The liquid crystal display device as set forth in claim 1, wherein:
in plan view, a storage capacitor counter electrode is provided between a picture element electrode and an adjacent picture element electrode adjacent to the picture element electrode in the first direction.

17. The liquid crystal display device as set forth in claim 1, wherein:
in plan view, an entire width of a scanning signal line in a region under a corresponding alignment control part completely overlaps the corresponding alignment control part.

18. The liquid crystal display device as set forth in claim 1, wherein:
the alignment control parts are spacers.

\* \* \* \* \*